United States Patent [19]

Laganis

[11] 4,179,420

[45] Dec. 18, 1979

[54] WATER SOLUBLE INSULATING VARNISH

[75] Inventor: Deno Laganis, Schenectady, N.Y.

[73] Assignee: Schenectady Chemicals, Inc., Schenectady, N.Y.

[21] Appl. No.: 709,107

[22] Filed: Jul. 27, 1976

Related U.S. Application Data

[63] Continuation-in-part of Ser. No. 624,569, Oct. 21, 1975, abandoned.

[51] Int. Cl.$^2$ .................... C09D 3/52; C09D 3/64; C09D 3/66; C09D 5/02
[52] U.S. Cl. .................... 260/21; 260/227 N; 260/22 R; 260/22 D; 260/22 M; 260/29.2 E; 260/29.2 UA; 528/272; 528/296; 528/302; 525/167; 525/172; 525/174
[58] Field of Search .................... 260/21, 22 TN, 22 R, 260/29.2 E, 22 D, 22 M, 75 R, 29.2 UA, 850; 528/272, 296, 302

[56] References Cited

U.S. PATENT DOCUMENTS

| | | | |
|---|---|---|---|
| 3,196,119 | 7/1965 | Boller et al. | 260/22 M |
| 3,207,715 | 9/1965 | Stephens | 260/22 M |
| 3,223,658 | 12/1965 | Kraft et al. | 260/22 M |
| 3,268,483 | 8/1966 | Klootwijk et al. | 260/22 M |
| 3,300,424 | 1/1967 | Hoenel et al. | 260/21 |
| 3,338,743 | 8/1967 | Laganis | 260/850 |
| 3,345,313 | 10/1967 | Ruhf et al. | 260/22 M |
| 3,379,548 | 4/1968 | Jen | 260/22 M |
| 3,434,987 | 3/1969 | Dhein et al. | 260/21 |
| 3,498,940 | 3/1970 | Laganis | 260/20 |
| 3,714,090 | 1/1973 | Lasher | 260/22 M |
| 3,956,228 | 5/1976 | Nogami et al. | 260/75 R |
| 3,959,200 | 5/1976 | Scott | 260/75 R |
| 4,004,062 | 1/1977 | Peterson | 260/29.2 E |
| 4,004,063 | 1/1977 | Peterson et al. | 428/383 |
| 4,007,146 | 2/1977 | Ishizuka et al. | 260/29.2 E |
| 4,008,195 | 2/1977 | Ishizuka et al. | 260/29.2 E |
| 4,011,185 | 3/1977 | Hosokawa et al. | 260/29.2 E |

*Primary Examiner*—Ronald W. Griffin
*Attorney, Agent, or Firm*—Cushman, Darby & Cushman

[57] ABSTRACT

Water dispersible oil-modified polyesters and oil-free polyesters are formed by the reaction of aromatic dicarboxylic acids, aliphatic dicarboxylic acids and polyols to form the polyester. In oil-free polyesters, oils of the respective fatty acids are excluded but the other reactants are similar to those employed in the preparation of oil-modified polyesters.

27 Claims, No Drawings

WATER SOLUBLE INSULATING VARNISH

This application is a continuation-in-part of application 624,569, filed Oct. 21, 1975, now abandoned.

THE BACKGROUND OF THE INVENTION

The invention is directed to oil-modified polyester products, as well as oil-free polyester products. The invention is directed to the novel process for the production of these products. Moreover, the invention is directed to novel compositions realized by using the oil-modified polyesters, or oil-free polyesters, to produce varnishes.

It is generally known that maleic anhydride or trimellitic anhydride can be used to form polyesters which can become water-soluble. The maleic anhydride or trimellitic anhydride act to provide carboxylic sites for aqueous solubilization. The polyesters produced from these reactants are rendered water-soluble by the aid of an amine, a metal oxide, hydroxide or carbonate.

It has been found that a variety of polycarboxylic acids, or their respective anhydrides, can be employed to produce polyester products to effect solubility, in the same manner as maleic anhydride or trimellitic anhydride effect solubility in polyester products.

The polyester products of the invention are water-dispersible polyesters which may be used as protective coatings systems for industrial and architectural applications.

The invention provides new polyesters which can be formed from compositions containing considerable amounts of monocarboxylic acids; alternatively, the polyesters of the invention can be formed from components with the exclusion of monocarboxylic acids altogether. Some of these new polyesters are commonly known as "oil-free" polyesters.

The polyesters of the invention may be used in improved coating systems for a variety of metal and nonmetal substrates and are characterized by superior heat and chemical resistance properties.

Aqueous coatings, formed from a polyester of the invention, have improved flow, wetting, non-foaming characteristics, as well as improved film continuity upon application to particular substrates.

SUMMARY OF THE INVENTION

The polyester-resin system, produced in accordance with the invention, includes both oil-modified polyesters as well as oil-free polyesters. Vegetable oils of the drying and nondrying types, or their respective fatty acids, are reacted with a combination of (1) specific aromatic dicarboxylic acids set forth hereinafter; (2) trimellitic anhydride, aliphatic dicarboxylic acids and their anhydrides and cycloaliphatic dicarboxylic acids and their anhydrides; and (3) polyols to form the alkyd or the oil-modified polyester. In the oil-free polyesters, oils or their respective fatty acids are excluded but the reactants used to form the oil-free polyesters, are similar to those employed in the preparation of the alkyds.

Another aspect of the invention is directed to the process for producing the oil-free and oil-modified polyesters. It has been discovered that if the aromatic dicarboxylic acid is reacted initially with the polyols (and/or diols), to form an intermediate, and subsequently the intermediate is reacted with the aliphatic (or cycloaliphatic) dicarboxylic acids or anhydrides, or trimellitic anhydride, the process to form the polyesters occurs more readily and at a lower temperature to allow better control of polymer formation.

The invention is also directed to varnishes produced by production of a polyester-triazine system, employing the polyesters of the invention.

DETAILED DESCRIPTION OF THE INVENTION

The invention is directed to water-dispersible polyesters, and their preparation, and usage in protective coating systems for industrial and architectural applications. Polyestertriazine resin systems formed from the polyesters of the invention, can be used as coreplate enamels and as insulating varnishes. These compositions also show promise as enamel top coats for metals.

THE POLYESTERS

These products include both oil-free and oil-modified polyesters. The oil-free products are produced from the reaction of at least three components: (1) an aromatic dicarboxylic acid as set forth hereinafter; (2) an aliphatic carboxylic acid or anhydride or a cycloaliphatic acid or anhydride or trimellitic anhydride; and (3) a polyol having at least three hydroxyl groups and/or a diol. For the oil- or fatty acid-modified polyesters an additional or fourth component is included, and the diol is optional. That is, aromatic polycarboxylic acids or their respective anhydrides, in addition to the conventional maleic anhydride or the like or trimellitic anhydride, have been discovered to be useful in forming the polyesters of the invention. When iso- or terephthalic acid is the sole acid in the polyester, it is extremely difficult to insure that all of the aromatic acid reacts with the polyol at an acid value range of 25 to 90 and to obtain an aqueous solution of that polyester which is clear. Even when solution clarity may be achieved under these circumstances, the package or storage ability suffers after a month or so of aging at normal ambient temperatures. The inclusion of the aliphatic (or cycloaliphatic) dicarboxylic acid or anhydride or trimellitic anhydride overcome these difficulties and its inclusion in the formulation of the polyester results in stabler aqueous solutions of the polyester.

Oil-Free Polyesters

The oil-free polyesters of the invention contain about 35 to 85%, preferably 60–70%, based on the total moles of the dibasic acid (or anhydride thereof) used to form the polyester, of an aromatic dibasic acid of the class defined hereinafter; and 15 to 65 mole percent, preferably 20 to 40 mole percent of an aliphatic dibasic acid (or anhydride thereof) or trimellitic anhydride based on the total moles of dibasic acid used to form the polyester; 20 to 55 mole percent of a diol based on all reactants; and 0 to 35 mole percent of a higher polyol based on total moles of reactants. From 0-50 mole percent or more of the aliphatic dibasic acid can be replaced by trimellitic anhydride. The trimellitic anhydride, for example can be up to 20 mole percent based on all reactants.

The aromatic dibasic acids, which are used in the oil-free products include isophthalic acid, terephthalic acid, 4,4'-benzophenone dicarboxylic acid and mixtures thereof.

The other acidic component is trimellitic acid or an aliphatic dibasic acid or anhydride of cycloaliphatic acid or anhydride such as adipic acid, succinic acid, azelaic acid, sebacic acid, dimerized fatty acids, e.g., dimerized linoleic acid, maleic anhydride, maleic acid, fumaric acid, tetrahydrophthalic anhydride, hexa hydrophthalic anhydride or 3,6-endomethylene, Δ-4-tetrahydrophthalic anhydride.

Diols which can be used in formulation of the oil-free products include ethylene glycol, 1,4-butylene glycol, propylene glycol, and the like, as well as dipropylene glycol, diethylene glycol, neopentyl glycol, dimethylol hydantoin, cyclohexane dimethanol, hydrogenated bisphenol A, hydroquinone di-(betahydroxyethyl) ether, the diether or propylene glycol and bisphenol A, the diether of ethylene glycol and bisphenol A, and the like.

The polyol, used to form the oil-free polyester can be trimethylol-propane, trimethylolethane, glycerine, pentaerythritol, as well as tris(hydroxyethyl)isocyanurate, tris(hydroxymethyl)-aminomethane.

The OH:COOH ratio of the oil-free polyesters may range from 1:1 to 1.3:1.

Oil- or Fatty Acid-Modified Polyester

The oil- or fatty acid-modified polyesters are formed from (1) (a) an unsaturated or saturated fatty acid of considerable chain length, (e.g., having 9 to 18 carbon atoms) wherein the percent of fatty acid in the composition may range from 5 to 60 weight percent, based on all reactant compositions; or (b) 5 to 65 percent by weight of vegetable oil; (2) 30 to 50 percent by weight of the aromatic dicarboxylic acid; (3) 3 to 30 percent by weight of the aliphatic (or cycloaliphatic) dicarboxylic acid; (4) 10 to 27 percent by weight of a polyol having at least three hydroxyl groups and optionally, 0 to 41 percent by weight of diol, usually 0 to 27% of diol. The OH:COOH ratio of oil-modified polyesters in accordance with invention ranges from 1:1 to 1.5:1.

The unsaturated fatty acid, used in forming the oil-modified polyesters can be either conjugated or non-conjugated. Examples of unsaturated fatty acids are linolenic acid, linoleic acid, oleic acid, elaeostearic acid, and the like. The saturated monocarboxylic acids which can be used include lauric acid, stearic acid, palmitic acid, isodecanoic acid, pelargonic acid, myristic acid, and the like. In addition, aromatic acids including benzoic acid, butyl benzoic acid, hydroxy-benzoic acid, e.g., salicylic acid, and the like may be employed.

There can be used natural linoleic acid which is normally the non-conjugated type or there can be used conjugated linoleic acid or a mixture thereof, e.g., a mixture in which part of the non-conjugated linoleic acid has been converted to conjugated linoleic acid by heating in the presence of a catalyst.

Mixtures of acids can be employed, e.g., a mixture of oleic acid and linoleic acid containing 11 to 47% oleic acid, as well as natural mixtures obtained by saponification of a fat followed by acidification.

Oils which can be used as the modifying substance in making the oil-modified polyesters include soybean oil, cottonseed oil, linseed oil, safflower oil, corn oil, tung oil, menhaden oil, tall oil, castor oil, palm oil, oiticica oil and the like.

The aromatic dicarboxylic acids which can be used to form the oil- or fatty acid-modified polyester include isophthalic acid, terephthalic acid, benzophenone dicarboxylic acid or mixtures thereof. The aliphatic dicarboxylic acids and anhydrides, cycloaliphatic dicarboxylic acids and anhydrides can be those previously set forth and of course there can also be used trimellitic anhydride.

The polyols used to form the oil-modified polyesters (as well as fatty acid-modified polyesters) include glycerine, trimethylolethane, trimethylolpropane, pentaerythritol, tris(hydroxymethyl)aminomethane and tris(hydroxyethyl)isocyanurate.

Diols which may be used to form the polyesters include neopentyl glycol, diethylene glycol, dimethylol hydantoin, dipropylene glycol, ethylene glycol, propylene glycol, cyclohexane dimethanol, hydrogenated bisphenol A, hydroquinone di-(betahydroxyethyl) ether, the diether of propylene glycol and bisphenol A, the diether of ethylene glycol and bisphenol A, and the like.

THE PROCESS

Another aspect of the invention, is the process of forming both the oil-free as well as the oil-modified polyesters of the invention. By way of explanation, when the terminology "oil-modified" is used hereinafter except in the working examples, it is meant to refer to oil-modified polyesters as well as polyesters modified by the fatty acids of such oils of the invention.

In accordance with the process of the invention, the aromatic dicarboxylic acid is reacted initially with the polyols (and fatty acids if employed). This reaction step obviates the problem of the lesser solubility of the aromatic dicarboxylic acids in the reaction medium, particularly isophthalic or terephthalic acid, and their slower reactivity which results in the necessity for higher processing temperatures. In the subsequent step, the aliphatic (or cycloaliphatic) dicarboxylic acid or trimellitic anhydride is reacted with the intermediate formed in the first step, at lower temperatures than temperatures of the first step. The lower temperatures of the second step, namely at 300° to 400° F., and preferably at 320°–375° F., allow for better control of polymer formation. As set forth above, the aliphatic or cycloaliphatic dicarboxylic acids are advantageously employed to provide easily solubilizible sites in the form of free carboxyl groups that are subsequently reacted with amines or metal hydroxides to form salts that are soluble in water.

In one embodiment of the process of the invention, the polyol of at least three hydroxyl groups and/or the diol are heated to elevated temperatures of at least 300° F. and then the aromatic dicarboxylic acid is added thereto. Heating of the diol, polyol with at least three hydroxyl groups and aromatic dicarboxylic acid is continued to the point at which distillation commences. The esterification reaction is continued until an acid number of 10 to 20 is attained at 100% solids.

Thereafter, the contents are cooled to a temperature of 300° F. The aliphatic dicarboxylic acid, cycloaliphatic dicarboxylic acid or trimellitic anhydride is then added to the contents of the reaction mixture which are at a temperature of about 300° F. Heating is resumed until an acid value range of from 25 to 90 is attained on a sample diluted to 80% solids. This procedure is critical and it is the addition of the trimellitic anhydride, aliphatic (or cycloaliphatic) dibasic acid or anhydride in the second stage of the process which appears to be the crux of the invention.

The advantage of the process is that it results in the possibility of producing polyesters from aromatic dicarboxylic acids which polyesters are reacted at an acid value range of 25 to 90 and which polyesters are characterized by being capable of forming an aqueous solution that is clear. Moreover, the polyesters produced in accordance with the process are characterized by package and storage stability.

When oil-modified polyesters are produced in accordance with the process of the invention, the oil-modifier is added to the reaction vessel, along with the polyol, the diol which is optional and the aromatic dicarboxylic acid in the initial step of the process.

THE VARNISH

The polyesters of the invention are capable of reacting with amino triazine-aldehyde reaction products to form useful varnish compositions. Preferably, the triazine aldehyde reaction product is hexamethoxy methyl melamine (the reaction product of melamine-formaldehyde and methanol). Other suitable triazines and triazine-aldehyde reaction products including etherified triazine-aldehyde reaction products are shown for example in Widmer U.S. Pat. No. 2,197,357, the entire disclosure of which is hereby incorporated by reference and relied upon. Thus there can be used trimethoxymethyl melamine, trimethylol melamine, etc.

In order to form the varnish composition, the polyester reaction product which is water dispersible produced in accordance with the process described above is diluted with a solvent to a solids content of at least about 30%, but may range as high as 50%. The solvent may be a polar or oxygenated solvent of the glycol ether, glycol diether or glycol ester types which is capable of being a solvent for the polyester concentrate. In the preferred embodiment set forth below in the examples, the solvents are butoxy propanol, and butoxy ethanol.

Thereafter, the polyester concentrate is rendered watersoluble by admixture and reaction with an amine, metal oxide, hydroxide or carbonate. Preferably an amine is used. Most preferably the amine, dimethylethanolamine is employed. Other suitable amines include ethanolamine, diethanolamine, 2-dimethylamino-2-methyl-1-propanol (DMAMP) 2-amino, 2-methyl, 1-propanol (AMP), N,N-diethyl ethanolamine, N-methyl(diethanol)amine, morpholine, triethanolamine, triethyl amine. Suitable oxides, hydroxides and carbonates include, barium oxides, calcium oxide, sodium hydroxide, potassium hydroxide, sodium carbonate, potassium carbonate, magnesium carbonate, barium hydroxide, and calcium hydroxide.

After the polyester has been admixed with the amine, metal oxide, hydroxide or carbonate, the mixture is treated with the triazine aldehyde component. A homogeneous mixture is obtained. Water is added slowly, with stirring. At approximately at least 30% solids content, the resulting varnish solution is clear.

The varnishes of the invention are formed from compositions which contain 25 to 50 percent by weight of a polyester concentrate (of at 30% solids contents usually about 80% solids content). The solubilizing agent, including amines, metal oxides, hydroxides or carbonates is present from 1.5 to 4 percent by weight. The triazine component is added in amounts of 4 to 25 percent by weight of the varnish composition. Water generally forms from about 30 to 55 percent by weight of the total varnish composition. Optionally, other solvents may be included in the varnish composition in amount of up to 30%.

Among the practical commercial advantages of the product of the invention are its superior heat and chemical resistance as compared to most other aqueous water-soluble or latex systems, as well as compared to organic solvent-soluble coatings. Furthermore being an aqueous system it is environmentally less polluting to the atmosphere and the user, and thus meets EPA standards more easily than organic solvent systems since it does not emit any reactive hydrocarbon solvents. Because of its excellent moisture resistance it has electrical properties that are on a par with organic solvent-based coatings. Other benefits include good wetting and adhesion to metal and glass cloth substrates, as well as to wood, fabric, plastic films or composites. Last, but not least, it has package stability that withstands hot and cold cycling for over a year, which latex and other aqueous systems fall far short of achieving.

The examples which follow will serve to elucidate the invention in great detail. The examples are meant to be exemplifications of the invention only and are not to be considered as limiting but are to be construed as encompassing all known alternative equivalents.

EXAMPLE 1

1. Preparation of Oil-Free Polyester

| | Reactants | Wt. grams | Equivalents | Moles |
|---|---|---|---|---|
| A) | Neopentyl Glycol | 582 | 11.20 | 5.60 |
| B) | Trimethylolpropane | 354 | 7.92 | 2.64 |
| C) | Isophthalic Acid | 797 | 9.60 | 4.80 |
| D) | Adipic Acid | 467 | 6.40 | 3.20 |

Procedure

To a five-liter, three-neck round bottom flask equipped with a stainless steel paddle agitator (motor driven), a thermometer to record batch temperature, a Snyder distillation column (with three bubble caps) topped by a distillation head, thermometer to measure head or vapor temperature of distillate, and connected to downward condenser and receiver is charged thereto materials (A) and (B). Heat is applied and temperature is raised to 330°–340° F.

At 330° F. material (C) is charged to the flask, and heated rapidly to the point whence distillation commences. From then on the heat input is regulated to control head temperature at 200°–212° F. to minimize glycol loss. The esterification is continued until an acid number of 10–20 is attained at 100 percent solids.

The contents of the flask are cooled to 300° F., and material (D) is added to the flask. Heating is resumed, and the esterification is continued until an acid number of 40.39 on a sample diluted to 80 percent solids in methoxy ethyl acetate is obtained. The molten polyester was subsequently dissolved in 472 grams butoxy propanol to provide a solution concentrate with the following properties:

| | |
|---|---|
| Viscosity, Gardner-Holdt Scale | Z7 ¾ at 25° C. |
| Solids, % | 80 |
| Acid Number (on solution) | 40.4 |
| Solvent | Butoxy Propanol |

2. Preparation of Electrical Insulating Varnishes

| | Varnish No. 1 | Wt. grams |
|---|---|---|
| A) | Above Polyester Concentrate of Ex. 1 | 269 |
| B) | Dimethylethanolamine | 16 |
| C) | Hexamethoxymethyl Melamine | 72 |
| D) | Deionized Distilled Water | 400 |

-continued

| Varnish No. 1 | | Wt. grams |
|---|---|---|
| E) | Butoxy Propanol | 45 |

Procedure

To a one-liter flask equipped with a motor-driven stainless steel agitator, condenser, and dropping funnel materials (A) and (B) are charged and mixed until uniform. Then material (C) is added, and stirred until homogeneous. Material (D) is added via dropping funnel at a slow, steady rate, and stirred until uniform. Material (E) is added to the flask, and stirred until uniform.

| Varnish No. 1 Liquid Characteristics | |
|---|---|
| Viscosity, Gardner-Holdt Scale | T ¼ at 25° C. |
| Solids, % | 35.8 |
| pH | 7.8 |
| % Curing Agent | 25 |
| % Oxygenated Solvent | 19.8 |
| Solution Appearance | Clear |

| | Varnish No. 2 | Wt. grams |
|---|---|---|
| A) | Above Polyester Concentrate of Ex. 1 | 269 |
| B) | Dimethylethanolamine | 16 |
| C) | Hexamethoxymethyl Melamine | 38 |
| D) | Deionized or Distilled Water | 400 |
| D) | Butoxy Propanol | 55 |

Procedure

Same as for Varnish No. 1.

| Varnish No. 2 Liquid Characteristics | |
|---|---|
| Viscosity, Gardner-Holdt Scale | T ½ at 25° C. |
| Solids, % | 32.5 |
| pH | 8.1 |
| Oxygenated Solvent, % | 21.4 |
| Curing Agent, % | 15 |
| Solution Appearance | Clear |

Test Results Varnish No. 1 was diluted with the addition of three parts butoxy propanol per 100 parts of varnish to get the proper coating thickness or build on copper strip. Varnish No. 2 needed no further adjustment—was used as supplied.

| Coatability | | Varnish No. 1 | Varnish No. 2 |
|---|---|---|---|
| on Copper Strip Baked Film | 2 dips | | |
| | Thickness | 0.97 mil/side | 1.05 mil/side |
| | Bake cycle | 1 hr. at 163° C. | 1 hr. at 163° C. |
| | Appearance | Smooth-Some voids or pinholes | Fairly Smooth Some voids or pinholes |
| on Glass Cloth Baked Film | 1 dip | | |
| | Bake cycle | 1 hr. at 163° C. | 1 hr. at 163° C. |
| | Appearance | Smooth | Smooth |
| Bond Strengths | | | |
| on Helical Coils 2 coats/side | | | |
| | Bake cycle | 2 hrs. at 163° C./coat | 2 hrs. at 163° C./coat |
| | lbs. at 25° C. | 43.4 | 60.3 |
| | lbs. at 150° C. | 5.6 | 4.6 |
| | Appearance | Some small | Smooth |

-continued

| Coatability | Varnish No. 1 | Varnish No. 2 |
|---|---|---|
| | blisters | |
| Deep Aluminum Dish Cures | 1 hr. at 163° C. | 1 hr. at 163° C. |
| 1 hr. at 163° C., 5 gm. sample | Cured hard | Cured hard |
| , 20 gm. sample | Cured hard | Cured hard |

EXAMPLE 2

1. Preparation of Oil-Free Polyester

| | Reactants | Wt. grams | Equivalents | Moles |
|---|---|---|---|---|
| A) | Neopentyl Glycol | 582 | 11.20 | 5.60 |
| B) | Trimethylolpropane | 354 | 7.92 | 2.64 |
| C) | Isophthalic Acid | 996 | 12 | 6 |
| D) | Adipic Acid | 175 | 2.40 | 1.20 |
| E) | Dimerized Soya Fatty Acids | 472 | 1.60 | 0.80 |

Procedure

Equipment and processing technique like Example 1. Materials (D) and (E) are added last at 300° F. Heating is resumed, and the esterification is continued until an acid number of 42.1 on a sample diluted to 80 percent solids in methoxy ethyl acetate is obtained. The molten polyester was subsequently dissolved in 581 grams butoxy propanol to provide a solution concentrate with the following properties:

| Viscosity, Gardner-Holdt Scale | Z8 ¾ at 25° C. |
|---|---|
| Solids, % | 80 |
| Acid Number (on solution) | 40.4 |
| Solvent | Butoxy Propanol |

2. Preparation of Electrical Insulating Varnishes

| | Varnish No. 1 | Wt. grams |
|---|---|---|
| A) | Above Polyester Concentrate of Ex 2. | 269 |
| B) | Dimethylethanolamine | 16 |
| C) | Hexamethoxy methyl Melamine | 38 |
| D) | Deionized or Distilled Water | 400 |
| E) | Butoxy Propanol | 80 |

Procedure

Same as for Varnish No. 1 of Example 1.

| Varnish No. 1 Liquid Characteristics | |
|---|---|
| Viscosity, Gardner-Holdt Scale | T ¼ at 25° C. |
| Solids, % | 31.5 |
| pH | 8.43 |
| % Curing Agent | 15 |
| % Oxygenated Solvent | 25.1 |
| Solution Appearance | Clear |

| | Varnish No. 2 | Wt. grams |
|---|---|---|
| A) | Above Polyester Concentrate of Ex. 2 | 269 |
| B) | Dimethylethanolamine | 16 |
| C) | Hexamethoxy methyl Melamine | 54 |
| D) | Deionized or Distilled Water | 300 |
| E) | Butoxy Propanol | 80 |

Procedure

Same as for Varnish No. 1 of Example 1.

| Varnish No. 2 Liquid Characteristics | |
|---|---|
| Viscosity, Gardner-Holdt Scale | T ½ at 25° C. |
| Solids, % | 37.4 |
| pH | 8.39 |
| % Curing Agent | 20 |
| % Oxygenated Solvent | 30.8 |
| Solution Appearance | Clear |

Test Results

Varnish No. 1 was diluted with the addition of two parts butoxy propanol per 100 parts of varnish to get the proper coating thickness or build on copper strip. Varnish No. 2 required four parts of solvent to get the proper build.

| Coatability | | Varnish No. 1. | Varnish No. 2 |
|---|---|---|---|
| on Copper Strip Baked Film | 2 dips | | |
| | Thickness | 0.92 mil/side | 0.92 mil/side |
| | Bake Cycle | 1 hr. at 163° C. | 1 hr. at 163° C. |
| | Appearance | Smooth | Smooth |
| on Glass Cloth Baked Film | 1 dip | | |
| | Bake Cycle | 1 hr. at 163° C. | 1 hr. at 163° C. |
| | Appearance | Smooth | Smooth |
| Bond Strengths | | | |
| on Helical Coils | | | |
| 2 coats/side | | 2 hrs. | 2 hrs. |
| Bake Cycle | | at 163° C. | at 163° C. |
| lbs. at 25° C. | | 55.6 | 55.4 |
| lbs. at 150° C. | | 4.5 | 5.3 |
| Deep Aluminum Dish Cures | | | |
| 1 hr. at 163° C., 5 gm. sample | | Cured Hard | Cured Hard |
| , 20 gm. sample | | Cured Hard | Cured Hard |

EXAMPLE 3

1. Preparation of a Drying Oil-Modified Polyester (a) Starting with Fatty Acids-to make Reconstituted Oil

| Reactants | Wt. grams | Equivalents | Moles |
|---|---|---|---|
| A) Tall Oil Fatty Acids (less than 2% rosin) | 820 | 2.80 | 2.80 |
| B) Trimethylolpropane | 523 | 11.70 | 3.80 |
| C) Dipropylene Glycol | 54 | 0.80 | 0.40 |
| D) Isophthalic Acid | 531 | 6.40 | 3.20 |
| E) Trimellitic Anhydride | 173 | 2.70 | 0.90 |

Procedure

Materials (A), (B), (C) and (D) are charged into a five-liter, three-neck round bottom flask equipped with a motor driven stainless steel paddle agitator, a thermometer to record batch temperature, a Dean-Stark water trap connected with a condenser to collect distillate evolved, and an inert gas sparge tube. Heat was applied to a Glas-Col heating mantle and the temperature was gradually increased to 410°–420° F. and held there until an acid number of 22.4 was obtained.

The contents of the flask were cooled to 300° F., and material (E) was added to the flask. Heating was resumed, and temperature was increased to 362° F., and held there until a sample thinned to 75 percent solids in methoxy propanol and had a viscosity of Z3¾ and an acid number of 43.76. The molten polymer was subsequently thinned to 80 percent solids with butoxy propanol.

2(a). Preparation of Electrical Insulating Varnishes

| | Varnish No. 1 | Wt. grams |
|---|---|---|
| A) | Above Polyester Concentrate of Ex. 3 | 295.9 |
| B) | Dimethylethanolamine | 17 |
| C) | Hexamethoxymethyl Melamine | 41.8 |
| D) | Deionized or Distilled Water | 385 |
| E) | Butoxy Propanol | 120 |

Procedure

Same as for Varnish No. 1 of Example 1.

| Varnish No. 1 Liquid Characteristics | |
|---|---|
| Viscosity, Gardner-Holdt Scale | T ½ |
| Solids, % | 32.4 |
| pH | 7.8 |
| % Curing Agent | 15 |
| % Oxygenated Solvent | 31.8 |
| Solution Appearance | Clear |

| | Varnish No. 2 | Wt. grams |
|---|---|---|
| A) | Above Polyester Concentrate of Ex. 3 | 295.9 |
| B) | Dimethylethanolamine | 17 |
| C) | Hexamethoxymethyl Melamine | 78.9 |
| D) | Deionized or Distilled Water | 385 |
| E) | Butoxy Propanol | 115 |

Procedure

Same as for Varnish No. 1 of Example 1.

| Varnish No. 2 Liquid Characteristics | |
|---|---|
| Viscosity, Gardner-Holdt Scale | T ½ |
| Solids, % | 35.4 |
| pH | 7.7 |
| % Curing Agent | 25 |
| % Oxygenated Solvent | 31.2 |
| Solution Appearance | Clear |

Test Results

Varnishes No. 1 and 2 as supplied provided the proper coating thickness.

| Coatability | | Varnish No. 1 | Varnish No. 2 |
|---|---|---|---|
| on Copper trip Baked Film | 2 dips | | |
| | Thickness | 0.87 mil/side | 0.97 mil/side |
| | Bake Cycle | 1 hr. at 163° C. | 2 hrs. at 163° C. |
| | Appearance | Smooth | Smooth |
| on Glass Cloth Baked Film | 1 dip | 1 hr. | 1 hr. |
| | Bake Cycle | at 163° C. | at 163° C. |
| | Appearance | Smooth | Smooth |
| Bond Strengths | on Helical Coils | | |
| | 2 coats/side | 2 hrs. | 2 hrs. |
| | Bake Cycle | at 163° C. | at 163° C. |
| | lbs. at 25° C. | 21.4 | 27.6 |
| | lbs. at 150° C. | 3.2 | 6.8 |

2(b). Preparation of Coreplate Enamel—Organic Type

Formulation is exactly the same as Varnish No. 1 of Example 3.

Test Results

| Coatability | Varnish No. 1 |
|---|---|
| on Electrical Grade Steel Coil | |
| Bake Film-Thickness | 0.1–0.2 mil |
| Bake Cycle | |
| Appearance | good |
| Coating Speed, ft./min. | 100–200 |
| Franklin Resistivity | |
| Hot Franklins | |

To illustrate in greater depth that solubilizing reactants, other than trimellitic anhydride, may be employed a series of polyesters was prepared which was modeled after Example 3 in which all the reactants are the same save for the minor diacid. In Table I the various minor dicarboxylic acids of the aliphatic, cycloaliphatic and bicycloaliphatic types are substituted for trimellitic anhydride on an equimolar basis thusly: see Table I—attached.

Procedure

Examples 4, 5, 6 and 7 employed the same equipment and processing technique as shown in Example 3. With respect to the processing controls, the following physicals were obtained prior to dilution to 80 percent solids in butoxy ethanol:

| | Examples | | | | |
|---|---|---|---|---|---|
| Process Physicals | 3 | 4 | 5 | 6 | 7 |
| Viscosity | Z 3 ¾ | X ¾ | X ¾ | U ½ | V ¾ |
| Acid Number | 43.76 | 37.0 | 37.0 | 33.2 | 33.66 |
| % Solids | 75 | 75 | 75 | 75 | 75 |

| | Examples | | | | |
|---|---|---|---|---|---|
| Process Physicals | 3 | 4 | 5 | 6 | 7 |
| Solvent | methoxy propanol | methoxy propanol | methoxy propanol | methoxy propanol | methoxy propanol |

The % solids refers to the solids of the polyester sample during its processing in order to control it to the correct final viscosity. Methoxy propanol was the solvent used to monitor the progress of the cook during processing. The polyesters after having been completely processed were thinned to 80 percent solids in butoxy propanol or butoxy ethanol, and they had the following liquid characteristics:

| | Examples | | | | |
|---|---|---|---|---|---|
| | 3 | 4 | 5 | 6 | 7 |
| Viscosity | — | Z4 ½ | Z3 ½ | Z4 | Z4 ½ |
| % Solids | 80 | 80 | 80 | 80 | 80 |
| Solvent | butoxy propanol | butoxy ethanol | butoxy ethanol | butoxy ethanol | butoxy ethanol |

The following varnishes were prepared from their respective concentrates:

| | Ex. 4 | | Ex. 5 | | Ex. 6 | | Ex. 7 | |
|---|---|---|---|---|---|---|---|---|
| | Vsh#1 | Vsh#2 | Vsh#1 | Vsh#2 | Vsh#1 | Vsh#2 | Vsh#1 | Vsh#2 |
| Polyester Concentrate | 269 | 269 | 269 | 269 | 269 | 269 | 269 | 269 |
| Dimethylethanolamine | 16 | 19 | 16 | 16 | 16 | 16 | 16 | 19 |
| Hexamethoxymethyl Melamine | 38 | 72 | 38 | 72 | 38 | 72 | 38 | 72 |
| Deionized Water | 340 | 340 | 340 | 200 | 340 | 220 | 340 | 340 |
| Butoxy Ethanol | 30 | 30 | 30 | 10 | 20 | 10 | 30 | 30 |

TABLE I

| | | Example 3 | | Example 4 | | Example 5 | | Example 6 | | Example 7 | |
|---|---|---|---|---|---|---|---|---|---|---|---|
| | | Wt (gms) | Moles | Wt (gms) | Moles | Wt (gms) | Moles | Wt (gms) | Moles | Wt (gms) | Moles |
| A) | Tall Oil Fatty Acids | 820 | 2.80 | 820 | 2.80 | 820 | 2.80 | 820 | 2.80 | 820 | 2.80 |
| B) | Trimethylolpropane | 523 | 3.80 | 523 | 3.80 | 523 | 3.80 | 523 | 3.0 | 523 | 3.80 |
| C) | Dipropylene Glycol | 54 | 0.40 | 54 | 0.40 | 54 | 0.40 | 54 | 0.40 | 54 | 0.40 |
| D) | Isophthalic Acid | 531 | 3.20 | 531 | 3.20 | 531 | 3.20 | 531 | 3.20 | 531 | 3.20 |
| E) | Trimellitic Anhydride | 173 | 0.90 | | | | | | | | |
| E') | Maleic Anhydride | | | 88 | 0.90 | | | | | | |
| E'') | Tetrahydrophthalic Anhydride | | | | | 137 | 0.90 | | | | |
| E''') | Hexahydrophthalic Anhydride | | | | | | | 139 | 0.90 | | |
| E'''') | 3,6-Endomethylene, 4-Tetrahydrophthalic Anhydride | | | | | | | | | 148 | 0.90 |

The liquid properties of the varnishes were:

| | Ex. 4 Varnishes | | Ex. 5 Varnishes | | Ex. 6 Varnishes | | Ex. 7 Varnishes | |
|---|---|---|---|---|---|---|---|---|
| | #1 | #2 | #1 | #2 | #1 | #2 | #1 | #2 |
| Viscosity | T ½ | T ¼ | T ¼ | T ½ | T ½ | T ½ | T ½ | T ¼ |
| Solids, % | 36.5 | 39.4 | 36.5 | 50.65 | 37.1 | 48.9 | 36.5 | 39.34 |
| pH | 7.8 | 8.45 | 7.6 | 7.7 | 8.21 | 8.19 | 7.65 | 8.4 |
| % Curing Agent | 15 | 25 | 15 | 25 | 15 | 25 | 15 | 25 |
| % Oxygenated Solvent | 19.8 | 19.8 | 19.8 | 24.2 | 17.8 | 22.5 | 19.8 | 19.8 |

Test Results

| | (Control) Example 3 Varnishes | | Example 4 Varnishes | | Example 5 Varnishes | | Example 6 Varnishes | | Example 7 Varnishes | |
|---|---|---|---|---|---|---|---|---|---|---|
| | #1 | #2 | #1 | #2 | #1 | #2 | #1 | #2 | #1 | #2 |
| Bond Strengths | | | | | | | | | | |
| lbs. at 25° C. | 21.4 | 27.6 | 22.5 | 26.3 | 24.5 | 25.1 | 22.2 | — | 22.0 | 24.5 |
| lbs. at 150° C. | 3.2 | 6.8 | 4.2 | 7.3 | 3.6 | 5.3 | 4.0 | — | 4.1 | 5.8 |
| Coatability | | | | | | | | | | |
| on Copper Strip | smooth | smooth | smooth | smooth | smooth | smooth | smooth | could not reduce to apply | smooth | smooth |
| on Glass Cloth | smooth | smooth | some blisters | some blisters | smooth | smooth | smooth | | smooth | smooth |
| Aluminum Dish Cures | | | | | | | | | | |
| 1 hr. at 163° C., 5 gms | cured | cured | cured | cured | cured | cured | cured | cured | cured | cured |
| , 20 gms | cured | cured | cured | cured | cured | cured | cured | cured | cured | cured |

EXAMPLE 8

1. Preparation of a Drying Oil-Modified Polyester
b. Starting with Natural Vegetable Oil

| | Reactants | Wt. grams | Equivalents | Moles |
|---|---|---|---|---|
| A) | Soybean Oil (Alkali refined) | 1431 | | 1.626 |
| B) | Trimethylol ethane | 429 | 10.725 | 3.575 |
| C) | Litharge | 0.72 | — | — |
| D) | Trimethylol ethane | 182 | 4.548 | 1.516 |
| E) | Isophthalic Acid | 792 | 9.54 | 4.77 |
| F) | Trimellitic Anhydride | 261 | 4.08 | 1.36 |

Procedure

Materials (A) and (B) are charged into a five-liter, three-neck round bottom flask equipped with a motor driven stainless steel paddle agitator, a thermometer to record batch temperature, a Dean-Stark connected with a condenser to collect distillate evolved, and an inert gas sparge tube. Heat was applied by means of Glas-Col heating mantle, and inert gas sparged through flask at a high rate. Temperature was rapidly increased to 300° F. and material (C) was added to the flask. Heating was continued and the temperature was raised to 460° F. It was held there for 45 minutes to complete the alcoholysis which was determined by taking a small sample of this mixture and reacting it with the appropriate amount of isophthalic acid in an aluminum dish until clear hot and then clear when cold.

The alcoholysate was cooled to 350° F. and materials (D) and (E) were added to the flask. Esterification was carried on at 390°–400° F., until an acid number of 20.8 on the solids was obtained. After cooling to 300° F. material (F) was added to the flask. The batch temperature was raised to 330°–340° F. and held there until a resin sample thinned to 65 percent solids in butoxy propanol, had attained a viscosity of Z1½ and an acid number of 43.2. The molten resin was subsequently diluted to 80 percent solids with butoxy propanol.

2. Preparation of Electrical Insulating Varnish

| | Varnish No. 1 | Wt. grams |
|---|---|---|
| A) | Above Polyester Concentrate of Ex. 8 | 296 |
| B) | Dimethylethanolamine | 21 |
| C) | Hexamethoxymethyl Melamine | 41.8 |

-continued

| | Varnish No. 1 | Wt. grams |
|---|---|---|
| D) | Deionized or Distilled Water | 445.5 |
| E) | Butoxy Propanol | 58.3 |

Procedure

Same as for Varnish No. 1 of Example 1.

| Varnish No. 1 Liquid Characteristics | |
|---|---|
| Viscosity, Gardner-Holdt Scale | T ¼ |
| Solids, % | 32.3 |
| pH | 8.2 |
| % Curing Agent | 15 |
| % Oxygenated Solvent | 20.9 |
| Solution Appearance | Clear |

Test Results

Varnish No. 1 was diluted further with the addition of six parts deionized water per 100 parts of varnish to get the desired coating thickness.

| Coatability | | Varnish No.1 |
|---|---|---|
| on Copper Strip Baked Film | 2 dips | |
| | Thickness | 1.08 mil/side |
| | Bake Cycle | 1 hr. at 163° C. |
| | Appearance | Smooth |
| on Glass Cloth Baked Film | 1 dip | |
| | Bake Cycle | 1 hr. at 163° C. |
| | Appearance | Smooth |
| Bond Strengths | on Helical Coils | |
| | 2 coats/side | |
| | Bake Cycle | 2 hrs. at 163° C. |
| | lbs. at 25° C. | 27.3 |
| | lbs. at 150° C. | 5.4 |
| Deep Aluminum Dish Cures | | |
| 1 hr. at 163° C., 5 gm. sample | | cured hard |
| , 20 gm. sample | | cured hard |

EXAMPLE 9

Long Oil Polyester-Non-TMA Type

| Reactants | Wt. grams | Equivalents | Moles |
|---|---|---|---|
| A) Soya Fatty Acids | 1120 | 4.00 | 4.00 |

-continued

| Reactants | Wt. grams | Equivalents | Moles |
|---|---|---|---|
| B) Glycerine (96%) | 430 | 13.44 | 4.48 |
| C) Isophthalic Acid | 531 | 6.40 | 3.20 |
| D) 3,6-Endomethylene, Δ 4-tetrahydrophthalic Anhydride | 131 | 1.60 | 0.80 |

Procedure

Equipment and processing techniques are similar to Example 3. Materials (A), (B) and (C) are charged to a five-liter flask, and are pre-reacted to an acid number of 25.2 at 100 percent solids.

The contents of the flask are cooled to 300° F., and material (D) is added to the flask. The temperature is gradually raised to 350°–360° F. and held there until a sample thinned to 75 percent solids in methoxy propanol attains a viscosity of J 1/4 and an acid number of 34.2. The resin was used at 100 percent solids in the preparation of the following varnishes, and there was very little or no need of any polar or oxygenated solvents to aid in recoatability wherever two or more coats were needed.

Preparation of Electrical Insulating Varnishes

| | Varnishes | No. 1 | No. 2 |
|---|---|---|---|
| A) | Above Polyester of Example 9 | 215 | 215 |
| B) | Dimethylethanolamine | 18 | 16 |
| C) | Hexamethoxymethyl Melamine | 72 | 143.5 |
| D) | Deionized or Distilled Water | 250 | 360 |
| E) | Butoxy Ethanol | 40 | — |
| | Liquid Constants | No. 1 | No. 2 |
| | Viscosity | T ½ | T ½ |
| | Solids, % | 48.3 | 48.8 |
| | pH | 8.5 | 8.4 |
| | % Curing Agent | 25 | 40 |
| | Solution Appearance | Clear | Clear |
| | % Oxygenated Solvent | 13.8 | 0 |

Tests Results

Varnishes Nos. 1 and 2 were alright as supplied to get the proper build on copper strip, and thus required no further dilution.

| Coatability | | Varnish No. 1 | Varnish No. 2 |
|---|---|---|---|
| on Copper Strip Baked Film | 2 dips Thickness | 0.98 mil/dip | 1.10 mil/dip |
| | Bake Cycle | 1 hr. at 163° C. | 1 hr. at 163° C. |
| | Appearance | Smooth | Smooth |
| on Glass Cloth Baked Film | 1 dip | — | — |
| | Bake Cycle | 1 hr. at 163° C. | 1 hr. at 163° C. |
| | Appearance | Smooth | Smooth |
| Bond Strengths | on Helical Coils 2 coats/side | | |
| | Bake Cycle | 2 hrs. at 163° C. | 2 hrs. at 163° C. |
| | lbs. at 25° C. | 18.4 | 22.5 |
| | lbs. at 150° C. | 2.7 | 4.5 |
| Deep Aluminum Dish Cures | | | |
| 1 hr. at 163° C. | 5gms. sample | cured | cured |
| | 20 gms. sample | cured | cured |

EXAMPLE 10

1. Preparation of a Non-Drying Oil-Modified Polyester a. Starting with a Saturated Fatty Acid—to make Reconstituted Oil

| | Reactants | Wt. grams | Equivalents | Moles |
|---|---|---|---|---|
| (A) | Pelagonic Acid | 379 | 2.40 | 2.40 |
| (B) | Trimethylolpropane | 571 | 12.78 | 4.26 |
| (C) | Neopentyl Glycol | 234 | 4.50 | 2.25 |
| (D) | Isophthalic Acid | 747 | 9.00 | 4.50 |
| (E) | Adipic Acid | 219 | 3.00 | 1.50 |

Procedure

Equipment and processing techniques are similar to Example 1. Materials (A), (B), (C) and (D) are charged to a five-liter flask, and are pre-reacted to an acid number less than 20 at 100 percent soilds.

The contents of the flask are cooled to 300° F., and material (E) is added to the flask. The temperature is gradually raised to 340°–350° F. and held there until a sample thinned to 75 percent solids in methoxy propanol attains a viscosity of Z1 and an acid number of 36.4. The molten polyester was thinned subsequently to 80 percent solids in butoxy ethanol.

2. Preparation of Electrical Insulating Varnishes

| | Varnish No. 1 | Wt. grams |
|---|---|---|
| (A) | Above Polyester Concentrate of Ex. 9 | 269 |
| (B) | Dimethylethanolamine | 18 |
| (C) | Hexamethoxymethyl Melamine | 72 |
| (D) | Deionized or Distilled Water | 300 |
| (E) | Butoxy Ethanol | 42 |

Procedure

Same as Varnish No. 1 of Example 1.

| Varnish No. 1 Liquid Characteristics | |
|---|---|
| Viscosity, Gardner-Holdt Scale | T ½ |
| Solids, % | 41 |
| pH | 8.35 |
| % Curing Agent | 25 |
| % Oxygenated Solvent | 24.2 |
| Solution Appearance | Clear |

| Varnish No. 2 | Wt. grams |
|---|---|
| A) Above Polyester Concentrate of Ex. 9 | 269 |
| B) Dimethylethanolamine | 18 |
| C) Hexamethoxymethyl Melamine | 116 |
| D) Deionized or Distilled Water | 300 |
| E) Butoxy Ethanol | 34 |

Procedure

Same as Varnish No. 1 of Example 1.

| Varnish No. 2 Liquid Characteristics | |
|---|---|
| Viscosity, Gardner-Holdt Scale | T ½ at 25° C. |
| Solids, % | 44.9 |
| pH | 8.46 |
| % Curing Agent | 35 |

-continued

| Varnish No. 2 Liquid Characteristics | |
|---|---|
| % Oxygenated Solvent | 22.6 |
| Solution Appearance | Clear |

Test Results

Varnishes Nos. 1 and 2 were diluted further with the addition of five parts of butoxy ethanol per 100 parts of varnish to get the desired coating thicknesses.

| Coatability | | Varnish No. 1 | Varnish No. 2 |
|---|---|---|---|
| on Copper Strip | 2 dips | | |
| Baked Film | Thickness | 1.05 mil/dip | 1.06 mil/dip |
| | Bake Cycle | 1 hr. at 163° C. | 2 hrs. at 163° C. |

| Coatability | | Varnish No. 1 | Varnish No. 2 |
|---|---|---|---|
| on Glass Cloth | Appearance 1 dip Bake Cycle | Smooth 1 hr. at 163° C. | Smooth 1 hr. at 163° C. |
| Bond Strength | Appearance on Helical Coils | Good | Good |
| | 2 coats/side Bake Cycle | 2 hrs. at 163° C. /coat | 2 hrs. at 163° C. /coat |
| | lbs. at 25° C. | 38.1 | 39.3 |
| | lbs. at 150° C. | 5.6 | 5.3 |
| Deep Aluminum Dish Cures | | | |
| 1 hr. at 163° C., 5 gms. sample | | cured soft | cured hard |
| 1 hr. at 163° C., 20 gms. sample | | cured soft | cured hard |

The results set forth in the following table, Table II, were based on experiments at the initial stages of the development of the invention disclosed herein. Table II is directed to alkyd and oil-free polyester based resins. Table III is directed to aqueous varnish solutions produced from the polyesters of Table II.

TABLE II

Aqueous System Insulating Varnishes
Alkyd and "Oil-Free" Polyester Base Resins
(on a molar basis)

| | I | II | III | IV | V | VI | VII | VIII | IX | X | XI | XII |
|---|---|---|---|---|---|---|---|---|---|---|---|---|
| Tall Oil Fatty Acids | | 1.40 | | 1.229 | | | | | | | | |
| Soya Fatty Acids | 1.629 | | | | 1.25 | 1.10 | 1.00 | 0.80 | 0.80 | | | |
| Pamolyn 347 | | | | 0.343 | | | | | | | | |
| Soybean Oil | | | 0.542 | | | | | | | | | |
| IPA | 1.590 | 1.60 | 1.590 | 1.590 | 1.60 | 0.78 | 1.60 | 1.60 | 1.60 | 0.55 | 0.70 | 0.65 |
| TMA | 0.453 | 0.45 | 0.453 | 0.453 | 0.50 | 0.22 | 0.50 | 0.50 | 0.50 | 0.15 | | |
| TMP | 2.159 | 1.95 | | 2 | | | | | | | 0.33 | 0.33 |
| TME | | | | | | | | | 1.27 | | | |
| G | | | 1.696 | | 1.80 | | 1.50 | 1.27 | | | | |
| DPG | | 0.20 | | 0.208 | | | | | | 1.12 | | |
| DEG | | | | | 0.72 | | 1.03 | 1.26 | 1.26 | | | |
| THEIC | | | | | | 1.00 | | | | | | |
| NPG | | | | | | 0.33 | | | | | 0.70 | 0.70 |
| TPA | | | | | | | | | | 0.10 | | |
| MA | | | | | | | | | | 0.20 | | |
| AA | | | | | | | | | | | 0.30 | 0.35 |

Legend:
IPA = Isophthalic Acid
TMA = Trimellitic Anhydride
TMP = Trimethylolpropane
TME = Trimethylolethane
G = Glycerine
MA = Maleic Anhydride
DPG = Dipropylene Glycol
DEG = Diethylene Glycol
THEIC = Trishydroxyethylisocyanurate
NPG = Neopentyl Glycol
TPA = Terephthalic Acid
AA = Adipic Acid
Pamolyn 347 is a Tall oil derived fatty acid mixture sold by Hercules and comprising 5% unconjugated linoleic, 46% conjugated linoleic acid and 47% oleic acid.

| Varnish No. | I | IIa | IIb | III | IV | V | VIa | VIb | VIIa | VIIb | VIIIa | VIIIb | VIIIc | IX | X |
|---|---|---|---|---|---|---|---|---|---|---|---|---|---|---|---|
| No. | Ia | | | | | | | | | | | | | | |
| Conc. Amt. | 296 | 303.5 | 289 | 322.8 | 296 | 322.8 | 354.64 | 354.64 | 322.8 | 322.8 | 6753 | 320.4 | 320.4 | 322.8 | 292.25 |
| Type | Prop B | BC | Prop B | Prop B | Prop B | Prop B | Prop B | Prop B | Prop B | PM 26.5 | Prop B | Prop B | Prop B | Prop B | Prop B |
| Polar Sol. Amt. | 90 | 45 | 50 | 5 | 80 | 28 | 21 | 17 | 30 | DPM 26.5 | 722 | 46.4 | 46.4 | 63.6 | |
| Type | DMEA | DMEA | DMEA | DMEA | DMEA | DMEA | DMEA | DMEA | DMEA | DMEA | DMEA | DMEA | DMEA | DMEA | DMEA |
| Amine Amt. | 17 | 22 | 22 | 19.2 | 20 | 20 | 14 | 15 | 20 | 19 | 586 | 24 | 24 | 22.8 | 17.6 |
| Type | Res-X-745 | X-745 | X-745 | X-745 | X-745 | X-745 | X-745 | X-745 | X-745 | X-745 | X-745 | X-745 | X-745 | X-745 | X-745 |
| Crosslinker Amt. | 42 | 41.8 | 78.9 | 45.6 | 42 | 45.6 | 49.4 | 93.27 | 45.6 | 45.6 | 961 | 64.6 | 86.09 | 45.6 | 41.25 |
| Deionized Water | 385 | 385 | 385 | 420 | 385 | 379.2 | 383.26 | 367.26 | 378.24 | 474.24 | 8143 | 394.24 | 394.24 | 408 | 533 |
| Solution Properties | | | | | | | | | | | | | | | |
| Visc. | T+ | T¹ | T¹ | T¹ | T¹ | T¹– | T¹ | T¹ | T¹+ | R¹ | T¹ | R | S | T¹ | T¹ |
| pH | 7.4 | 7.91 | 8.2 | 7.88 | 7.7 | 7.65 | 7.9 | 7.65 | 7.92 | 7.57 | 7.5 | 7.75 | 7.85 | 8.32 | 8.12 |
| Solids % Calcd. | 33.6 | 35.0 | 38.2 | 37.4 | 33.9 | 38.6 | 40.5 | 44.1 | 38.1 | 33.3 | 37.3 | 38.25 | 39.6 | 35.2 | 31.1 |
| Solvent Ratio | 72.9 | 77.5 | 79 | 85.8 | 74.4 | 80 | 80 | 80 | 80 | 80 | 80 | 78.4 | 78.4 | 76.1 | |
| H₂O | 27.1 | 22.5 | 21 | 14.2 | 25.6 | 20 | 20 | 20 | 20 | 20 | 20 | 21.6 | 21.6 | 23.9 | |
| Org. Sol. | | | | | | | | | | | | | | | |
| MF | 15 | 15 | 25 | 15 | 15 | 15 | 15 | 25 | 15 | 15 | 15 | 20 | 25 | 15 | 15 |

| Varnish No. | I | IIa | IIb | III | IV | V | VIa | VIb | VIIa | VIIb | VIIIa | VIIIb | VIIIc | IX | X |
|---|---|---|---|---|---|---|---|---|---|---|---|---|---|---|---|
| Film Properties | | | | | | | | | | | | | | | |
| Bond Strength- | APR-2000 | | | | | | | | | | | | | | |
| lbs. at 25° C. | 17.9 | 18.4 | 25.8 | 13.9 | 20.2 | 14.1 | 17.0 | 31.1 | 17.6 | 19.8 | 15.6 | 15.7 | 24.6 | 32.9 | 20.7 |
| lbs. at 150° C. | 3.36 | 2.88 | 6.0 | 2.94 | 3.34 | 3.8 | 3.22 | 5.78 | 3.82 | 3.8 | 2.0 | 3.36 | 5.02 | 4.18 | 2.5 |
| Dielectrics | | | | | | | | | | | | | | | |
| Dry, KV/mil | | 3157 | 3250 | | | | | | | | | | | | |
| Wet, KV/mil | | 3157 | 2826 | | | | | | | | | | | | |
| Burnout, APR-2000 | | 14.10 | 9.25 | | | | | | | | | | | | |
| | | 9.25 | 7.32 | | | | | | | | | | | | |
| PGA Analysis | | | | | | | | | | | | | | | |
| °C. at 50% Wt. Loss | | 497 | 479 | | | | | | | | 435 | 436 | 424 | | |
| Coatability | | | | | | | | | | | | | | | |
| on Copper Strip | Good | Good | Good | Good | Good | Good | Good | Good | Good | Good | Good | Good | Good | Good | Good |
| on Glass Cloth | — | Fair | Poor | Good | — | Good | Good | Good | Good | Poor | Good | Good | Good | Good | Good |

EXAMPLE 11

Films prepared from a commercial insulating varnish in accordance with Example 3, Varnish 1, were tested Employing the ASTM test set forth in Example 11, a comparison was made between aluminum phosphate and the pigmented enamel of Example 12. The results are given in the following table:

TABLE

| Comparison of C-5 Type Coatings For Silicon Steel | | | |
|---|---|---|---|
| Aluminum Phosphate | | Pigmented Coreplate Enamel of Example 12 | |
| Franklin Values | (Amperes) | Full Strength | Dilute |
| RT | .01 | .21 | .25 |
| 1300° F. | .15 | — | — |
| 1350° | .20 | — | — |
| 1400° | .20 | — | — |
| 1450° | .18 | .50 | .32 |
| 1500° | .16 | .34 | .44 |
| 1550° | .14 | .28 | .48 |
| Coating Thickness Average (Top & Bottom) Inches | | | |
| RT | $3.0 \times 10^{-4}$ | $4 \times 10^{-5}$ | $3 \times 10^5$ |
| 1300°F. | $2.5 \times 10^{-4}$ | — | — |
| 1350° | $2.5 \times 10^{-4}$ | — | — |
| 1400° | $1 \times 10^{-4}$ | — | — |
| 1450° | $1.2 \times 10^{-4}$ | $3 \times 10^{-5}$ | $3 \times 10^{-5}$ |
| 1500° | $1 \times 10^{-4}$ | $3 \times 10^{-5}$ | $3 \times 10^{-5}$ |
| 1550° | $4 \times 10^{-5}$ | $2 \times 10^{-5}$ | $3 \times 10^{-5}$ |
| RT | Small amount of dusting | Smooth and Adherent* | |
| 1300° F. | — | — | |
| 1350° | — | — | |
| 1400° | — | — | |
| 1450° | Light Flaking | Light Carbon Residue | |
| 1500° | More Severe Flaking | Light Carbon Residue | |
| 1550° | Flaking Severe Throughout | Light Carbon Residue | |

*Results were the same for both full strength and dilute for resistivity by the ASTM test known as "Insulation Resistance", Method 2, ASTM A 344. Franklin values in such test are subject to specimen variations. Among those characteristics that vary are flatness of the steel, film thickness, degree of cure and the kind and the amount of water that may be used to dilute the enamel prior to application.

On C-3 Coreplate, the following were obtained:
(a) Type 3A- 0.5 to 0.7 amp. at film thicknesses of 0.05 mil.
(b) Type 3C- 0.3 to 0.4 amp. at film thicknesses of 1.0 mil.
(c) Special application for large generators- 0.2–0.3 amp. at thicknesses of 1.5 mil.

These values were obtained using cure temperatures of 700° to 750° F. This cure turns the steel blue. The customer who carried out the test was pleased with the product of the invention because of its overall consistency of performance.

EXAMPLE 12

The same basic resin as in Example 3 was also compounded into a pigmented enamel. The formula is as follows:

| Pigmented Coreplate Enamel Composition | |
|---|---|
| | Parts By Weight |
| Polyester Concentrate of Example 3 | 1206 |
| Hexamethoxymethyl Melamine | 193 |
| Butoxyethanol | 603 |
| Dimethylethanolamine | 90 |
| Borax (Na$_2$B$_4$O$_7$10H$_2$O) | 52 |
| Silica (micron size) | 175 |
| Diatomaceous Earth | 207 |
| Antifoaming Agent | 4 |
| 2-Ethylhexanol | 30 |
| Deionized Water | 2200 |

The pH of commercial enamels made in accordance with Example 12 varies between 7.9–8.3.

It is apparent thus that there has been provided, in accordance with the invention, polyesters, a process for the production, and compositions resulting from their use, that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, the foregoing description is intended to embrace all such alternatives, modifications and variations as fall within the spirit and broad scope of the appended claims.

What is claimed is:

1. A process for forming a water-dispersible polyester capable of being solubilized to become water-soluble comprising reacting (1) with (2a) to form (I), wherein
   (1) is isophthalic acid, terephthalic acid, benzophenone dicarboxylic acid or mixtures thereof and wherein
   (2a) includes a polyol having at least three hydroxyl groups and a diol, wherein said polyol is trimethylol-propane, tris(hydroxymethyl)aminoethane, trimethylolethane, glycerine, pentaerythritol or tris(hydroxyethyl)isocyanurate and said diol is neopentyl glycol, 1,4-butylene glycol, dimethyl hydantoin, dipropylene glycol, ethylene glycol, diethylene glycol, propylene glycol, cyclohexane dimethanol, hydrogenated bisphenol A, hydroquinone di-(beta-hydroxyethyl) ether, the diether of propylene glycol and bisphenol A, or the diether of ethylene glycol and bisphenol A; wherein said triol is present in amounts up to 35 mole percent of all reactants used to form said polyester;
   wherein said polyol and said diol are heated together and then said component (1) is added thereto;

and adding (II) which is (a) trimellitic anhydride; (b) an aliphatic dibasic acid which is adipic acid, succinic acid, azelaic acid, sebacic acid, dimerized fatty acids, maleic acid, fumaric acid or an anhydride of said acids or (c) a cycloaliphatic acid which is tetrahydrophthalic acid, hexahydrophthalic acid, 3,6-endomethylene, delta$^4$-tetrahydrophthalic acid or an anhydride of said acid, which component (II) is 15 to 65 mole percent based on the total moles of (1) and (II), and wherein (1) comprises 35 to 85 mole percent of the total amount of (1) and (II);

wherein the mixture of (1) and (2a) is heated until a portion of the mixture containing 100 percent solids is characterized by an acid number of at least about 10.

2. The process of claim 1, wherein said polyester further includes a mixture of a saturated or unsaturated fatty acid which is non-conjugated or conjugated linoleic acid, linolenic acid, oleic acid, palmitic acid, stearic acid, elaeostearic acid, lauric acid, myristic acid, pelargonic acid, isodecanoic acid or mixtures thereof in an amount ranging from 5 to 60 percent by weight of said polyester.

3. The process of claim 1, wherein said acid number ranges up to 20.

4. The process of claim 1, wherein said heating step is followed by cooling and then by addition of component (B).

5. The process of claim 4, wherein said addition is followed by heating.

6. The process of claim 5, wherein said heating step following addition is maintained until the reaction product, when diluted to 80 percent solids, attains an acid value of about 40.

7. A water-dispersible polyester capable of being solubilized to become water-soluble, comprising the reaction product of component (I) and component (II) wherein:

(I) is the reaction product of
 (1) isophthalic acid, terephthalic acid; benzophenone dicarboxylic acid or mixtures thereof; and
 (2) 0 to 41 percent by weight, based on the total weight of reactants used to form said polyester, of a diol which is neopentyl glycol, 1,4-butylene glycol, dimethyl hydantoin, dipropylene glycol, ethylene glycol, diethylene glycol, propylene glycol, cyclohexane dimethanol, hydrogenated bisphenol A, hydroquinone di-(beta-hydroxyethyl) ether, the diether of propylene glycol and bisphenol A, or the diether of ethylene glycol and bisphenol A and 10 to 27 percent by weight based on the total weight of all reactants of a polyol having at least three hydroxyl groups which is trimethylol-propane, tris(hydroxymethyl)aminoethane, trimethylolethane, glycerine, pentaerythritol or tris(hydroxyethyl) isocyanurate; and
 (3) a saturated or unsaturated fatty acid which is non-conjugated or conjugated linoleic acid, linolenic acid, oleic acid, palmitic acid, stearic acid, elaeostearic acid, lauric acid, myristic acid, pelargonic acid, isodecanoic acid or mixtures thereof in an amount ranging from 5 to 60 percent by weight of said polyester, and wherein (II) is (a) trimellitic anhydride; or (b) or aliphatic dibasic acid which is adipic acid, succinic acid, azelaic acid, sebacic acid, dimerized fatty acids, maleic acid, fumaric acid or an anhydride of said acids or (c) a cycloaliphatic acid which is tetrahydrophthalic acid, hexahydrophthalic acid, 3,6-endomethylene, delta$^4$-tetrahydrophthalic acid or an anhydride of said acid, which component (II) is 15 to 65 mole percent based on the total moles of (1) and (II), wherein (1) comprises 35 to 85 mole percent of the total amount of (1) and (II);

wherein the OH:COOH ratio of said polyester ranges from 1:1 to 1.5:1.

8. The polyester of claim 7, wherein said OH:COOH ratio is 1:1 to 1.3:1.

9. The polyester of claim 7, dispersed in water.

10. The polyester of claim 7, including both a polyol having at least three hydroxyl groups and a diol.

11. The polyester of claim 10, wherein said polyol is trimethylol propane and said diol is dipropylene glycol.

12. The polyester of claim 10, wherein said polyester includes isophthalic acid and trimellitic anhydride.

13. The polyester of claim 7, wherein said diol is neopentyl glycol.

14. The polyester of claim 13, wherein said polyol is trimethylol-propane.

15. The polyester of claim 14, wherein said element (1) is isophthalic acid.

16. The polyester of claim 15, which includes adipic acid.

17. The polyester of claim 7, wherein the diol is dipropylene glycol, diethylene glycol or neopentyl glycol.

18. The polyester of claim 7, wherein the polyol is trimethylolpropane, trimethylolethane, glycerine or tris(hydroxyethyl)isocyanurate.

19. The polyester of claim 7, wherein (B) is maleic anhydride, or adipic acid.

20. The polyester of claim 7, wherein (B) is maleic anhydride, tetrahydrophthalic anhydride, hexahydrophthalic anhydride, 3,6-endomethylene, Δ$^4$-tetrahydrophthalic anhydride or trimellitic anhydride.

21. The polyester of claim 7, which is water-soluble.

22. The reaction product formed by reacting the polyester of claim 7 with an amino triazine-aldehyde reaction product.

23. The product of claim 22, wherein said triazine is hexamethoxymethyl melamine.

24. A water-dispersible polyester capable of being solubilized to become water-soluble comprising 2.8 moles of tall oil fatty acids, 3.8 moles of trimethylol propane, 0.4 mole of dipropylene glycol, 3.2 moles of isophthalic acid and 0.9 mole of trimellitic anhydride.

25. The product produced by the process of claim 1, admixed with water.

26. A pigmented enamel comprising the product of claim 25.

27. The product produced by the process of claim 3, admixed with water.

* * * * *